US008968601B2

(12) United States Patent  
Moon et al.

(10) Patent No.: US 8,968,601 B2  
(45) Date of Patent: Mar. 3, 2015

(54) ALKALINE EARTH METAL CO-PRECIPITATED NICKEL-BASED CATALYST FOR STEAM CARBON DIOXIDE REFORMING OF NATURAL GAS

(71) Applicant: Korea Institute of Science and Technology, Seoul (KR)

(72) Inventors: Dong Ju Moon, Seoul (KR); Yun Ju Lee, Icheon (KR); Jae Sun Jung, Seoul (KR); Jin Hee Lee, Gwangju (KR); Seung Hwan Lee, Gyeonggi-do (KR); Bang Hee Kim, Seoul (KR); Hyun Jin Kim, Seoul (KR); Eun Hyeok Yang, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 13/971,182

(22) Filed: Aug. 20, 2013

(65) Prior Publication Data

US 2014/0339475 A1 Nov. 20, 2014

(30) Foreign Application Priority Data

May 16, 2013 (KR) .......................... 10-2013-0055477

(51) Int. Cl.
*C01B 3/26* (2006.01)
*C01B 3/38* (2006.01)
(Continued)

(52) U.S. Cl.
CPC .............. *B01J 23/8946* (2013.01); *B01J 23/78* (2013.01); *C01B 3/40* (2013.01); *Y10S 502/524* (2013.01)
USPC ........... 252/373; 423/653; 423/654; 502/327; 502/328; 502/332; 502/335; 502/341; 502/355; 502/415; 502/439; 502/524

(58) Field of Classification Search
CPC .............. C01B 2203/0233; C01B 2203/0238; C01B 2203/1047; C01B 2203/1052; C01B 2203/1058; C01B 3/40; B01J 23/00; B01J 23/005; B01J 23/755; B01J 23/78; B01J 23/892; B01J 23/8946; B01J 21/04; B01J 37/02; B01J 27/0201; B01J 37/0236; B01J 37/03; B01J 37/08; B01J 37/16
USPC .......... 423/653, 654; 502/327, 328, 332, 335, 502/341, 355, 415, 439, 524; 252/373
See application file for complete search history.

(56) References Cited

U.S. PATENT DOCUMENTS 3,436,358 A * 4/1969 Thygesen ..................... 502/328  
3,840,356 A * 10/1974 Bernusset et al. .......... 48/214 A  
(Continued)

FOREIGN PATENT DOCUMENTS

JP 11-276893 A 10/1999  
KR 1020030061395 A 7/2003  
(Continued)

OTHER PUBLICATIONS

R.M. Navarro, et al; "Hydrogen Production Reactions from Carbon Feedstocks: Fossil Fuels and Biomass", Chem. Rev., vol. 107, pp. 3952-3991; Epub, Aug. 23, 2007.
(Continued)

*Primary Examiner* — Cam N. Nguyen  
(74) *Attorney, Agent, or Firm* — Ladas & Parry LLP

(57) ABSTRACT

Disclosed is a catalyst used for steam carbon dioxide reforming of natural gas, wherein an alkaline earth metal alone or an alkaline earth metal and a group 8B metal are supported on a hydrotalcite-like catalyst containing nickel, magnesium and aluminum. The disclosed catalyst is useful as a steam carbon dioxide reforming (SCR) catalyst of natural gas at high temperature and high pressure, while minimizing deactivation of the catalyst due to sintering of the active component nickel and deactivation of the catalyst due to coke generation at the same time. A synthesis gas prepared using the catalyst has a $H_2/CO$ molar ratio maintained at 1-2.2. A synthesis gas having a $H_2/CO$ molar ratio of 1.8-2.2 may be used as a raw material for Fischer-Tropsch synthesis or methanol synthesis and a synthesis gas having a $H_2/CO$ molar ratio of may be used as a raw material for dimethyl ether synthesis.

12 Claims, 2 Drawing Sheets

(51) Int. Cl.
*C07C 1/02* (2006.01)
*B01J 23/00* (2006.01)
*B01J 23/02* (2006.01)
*B01J 23/08* (2006.01)
*B01J 23/40* (2006.01)
*B01J 23/42* (2006.01)
*B01J 23/44* (2006.01)
*B01J 23/56* (2006.01)
*B01J 23/58* (2006.01)
*B01J 20/00* (2006.01)
*B01J 21/04* (2006.01)
*B01J 23/89* (2006.01)
*B01J 23/78* (2006.01)
*C01B 3/40* (2006.01)

(56) References Cited

U.S. PATENT DOCUMENTS

| | | | | |
|---|---|---|---|---|
| 4,469,815 | A | * | 9/1984 | Sambrook et al. ............ 502/303 |
| 5,399,537 | A | * | 3/1995 | Bhattacharyya et al. ....... 502/84 |
| 5,653,774 | A | * | 8/1997 | Bhattacharyya et al. .... 48/198.7 |
| 5,767,040 | A | * | 6/1998 | Bhattacharyya et al. ..... 502/327 |
| 5,939,353 | A | * | 8/1999 | Bhattacharyya et al. ..... 502/327 |
| 6,416,731 | B1 | * | 7/2002 | Dohrup et al. ................. 423/653 |
| 6,953,488 | B2 | * | 10/2005 | Bhattacharyya et al. .... 48/198.7 |
| 8,486,368 | B2 | * | 7/2013 | Takahashi et al. ............. 423/654 |
| 2003/0032554 | A1 | * | 2/2003 | Park et al. ..................... 502/302 |
| 2004/0077496 | A1 | * | 4/2004 | Zhao et al. ..................... 502/328 |
| 2004/0142817 | A1 | * | 7/2004 | Park et al. ..................... 502/335 |
| 2006/0275194 | A1 | * | 12/2006 | Gary ............................. 423/417 |
| 2013/0287679 | A1 | * | 10/2013 | Takahashi et al. ............. 423/654 |

FOREIGN PATENT DOCUMENTS

KR   1020100014012 A   2/2010
KR   1020100065504 A   6/2010

OTHER PUBLICATIONS

Yun Ju Lee, et al; "Syngas production by the SCR of methane over Ca-Ni/MgAl catalyst", AIchE Annual Meeting Oct. 28 Nov. 2, Pittsburgh, PA, 1 page.

Dae Hwan Kim, et al; Studies on SCR of Methane over Modified Hydrotalcite Based Catalyst, Published Apr. 24, 2013, 1 page; AIChE Annual Meeting, Pittsburgh, PA.

* cited by examiner

ALKALINE EARTH METAL CO-PRECIPITATED NICKEL-BASED CATALYST FOR STEAM CARBON DIOXIDE REFORMING OF NATURAL GAS

CROSS-REFERENCE TO RELATED APPLICATIONS

This application claims priority under 35 U.S.C. §119 to Korean Patent Application No. 10-2013-0055477, filed on May 16, 2013, in the Korean Intellectual Property Office, the disclosure of which is incorporated herein by reference in its entirety.

BACKGROUND (a) Technical Field

The present invention relates to a catalyst used for steam carbon dioxide reforming of natural gas, wherein an alkaline earth metal alone or an alkaline earth metal and a group 8B metal are supported on a hydrotalcite-like catalyst containing nickel, magnesium and aluminum.

(b) Background Art

With the recent surging oil prices, interests in alternative energy are increasing day by day. In particular, preparation of synthetic fuels using natural gas buried in stranded gas fields is becoming more important as a new source of energy. The reforming reaction for preparing synthesis gas from natural gas is achieved by reforming of methane, which is the main component of natural gas.

The reforming reactions for preparing synthesis gas from natural gas can be classified into steam reforming (SR), partial oxidation (POX), autothermal reforming (ATR), carbon dioxide reforming (CDR), steam carbon dioxide reforming (SCR), tri-reforming (TriR) or the like.

Steam reforming (SR): $CH_4+H_2O \rightarrow 3H_2+CO$     ①

Partial oxidation (POX): $CH_4+0.5O_2 \rightarrow 2H_2+CO$     ②

Autothermal reforming (ATR): $CH_4+0.5O_2+H_2O \rightarrow 3H_2+CO_2$     ③

Carbon dioxide reforming (CDR): $CH_4+CO_2 \rightarrow 2H_2+2CO$     ④

Steam carbon dioxide reforming (SCR): $2CH_4+H_2O+CO_2 \rightarrow 5H_2+3CO$     ⑤

Tri-reforming (TriR): $3CH_4+H_2O+0.5O_2+CO_2 \rightarrow 7H_2+4CO$     ⑥

As seen from the above reaction formulas, since the synthesis gas produced from each reforming reaction has a different molar ratio of carbon monoxide to hydrogen, the synthesis gases prepared from different reforming reactions are used for different applications.

At present, methods for preparing synthesis gases whose $H_2/CO$ molar ratios can be controlled variously through reforming of methane are studied variously. Among them, CDR is drawing a lot of attentions because it utilizes carbon dioxide as reactant. However, since the CDR reaction has a fatal problem that the catalyst is deactivated due to carbon deposition, the steam carbon dioxide reforming (SCR) which combines SR and CDR was provided to solve the problem [*Chem. Rev.* 2007, 107, 3952-3991]. A method of controlling the $H_2/CO$ molar ratio of a synthesis gas in the SCR reaction by controlling the molar ratio of reactants $CH_4/CO_2/H_2O$ and the recirculation ratio of unreacted reactants was reported [Korean Patent No. 10-1068995].

A floating, production, storage and offloading (FPSO) facility is a floating energy plant which is superior in durability and safety as compared previous floating facilities. The FPSO unit includes an apparatus for drilling crude oil and an apparatus for separating the crude oil in glassy oil state from associated gas. The FPSO unit also includes an apparatus for storing the crude oil and an apparatus for offloading the crude oil to a means for transporting the crude oil. The associated gas produced along with the oil in the oil-FPSO process is either burnt off and released into the atmosphere or compressed and then reinjected into the oil wells. Thus, the GTL-FPSO, DME-FPSO or MeOH-FPSO process may be considered to utilize the associated gas from the oil fields as a raw material in the gas-to-liquids (GTL) process after preparing a synthesis gas aboard the FPSO. In particular, it is important to develop an economical and compact process to convert the gas from offshore oil fields and stranded gas fields into a synthetic fuel with minimized investment and operation costs. Since the gas pressure at the offshore oil fields or stranded gas fields is about 80 bar and synthesis of dimethyl ether, Fischer-Tropsch synthesis or synthesis of methane following reforming occurs at 20 bar or above, it is desirable that the reforming process occur in a pressure range of 20-80 bar to achieve a compact, economical process.

As a catalyst for steam carbon dioxide reforming (SCR) of natural gas, a nickel-based catalyst wherein nickel (Ni) is supported as an active component on a Ce/Mg—Al or Ce—Zr/Mg—Al support is commonly used [Korean Patent No. 991,263]. The catalyst disclosed in Korean Patent No. 991,263 is used under a low-pressure condition of around the atmospheric pressure and is known to exhibit very low catalytic activity at high pressures of 20 bar or above.

Thus, the inventors of the present invention have made efforts to develop a novel catalyst which can be used not only under an atmospheric pressure condition but also under a high pressure condition of 20-80 bar to prepare a synthesis gas having an $H_2/CO$ molar ratio of approximately 1-2.2 by steam carbon dioxide reforming (SCR) of natural gas, particularly a synthesis gas having an $H_2/CO$ molar ratio of 1.8-2.2 which is appropriate for Fischer-Tropsch synthesis or methanol synthesis.

SUMMARY

The present invention provides a nickel-based catalyst wherein an alkaline earth metal alone or an alkaline earth metal and a group 8B metal are supported on a hydrotalcite-like catalyst containing nickel, magnesium and aluminum.

The present invention also provides a method for preparing a synthesis gas having a hydrogen/carbon monoxide molar ratio of 1-2.2 by performing steam carbon dioxide reforming of methane in the presence of the nickel-based catalyst.

The present invention further provides a method for utilizing the synthesis gas prepared using the nickel-based catalyst for preparation of clean fuel by Fischer-Tropsch synthesis, methanol synthesis or dimethyl ether synthesis. In particular, the synthesis gas having an $H_2/CO$ molar ratio of 1.8-2.2 may be used for Fischer-Tropsch synthesis or methanol synthesis and the synthesis gas having an $H_2/CO$ molar ratio of 1-1.2인 synthesis gas may be used for dimethyl ether synthesis.

In an aspect, the present invention provides a nickel-based catalyst represented by Chemical Formula 1, which is used for steam carbon dioxide reforming of natural gas using steam and carbon dioxide:

$A_a$-$B_b$-$Ni_x$/$Mg_y$Al     [Chemical Formula 1]

wherein A is one or more group 8B metal atom, B is one or more alkaline earth metal atom, a and b are supporting amounts of the group 8B metal atom and the alkaline earth metal atom based on $Ni_x/Mg_yAl$, with a being 0-10 wt % and b being 0.1-10 wt %, x is a Ni/Al molar ratio and is 0.25-1, y is a Mg/Al molar ratio and is 0.6-5.5, and x/y is 0.15-0.45.

In another aspect, the present invention provides a method for preparing a nickel-based catalyst, including: preparing a solution of a precursor with a hydrotalcite structure containing a magnesium precursor and an aluminum precursor; preparing a $Ni_x/Mg_yAl$ hydrotalcite-like catalyst wherein nickel partially replaces magnesium by adding a nickel precursor to the solution of the precursor with a hydrotalcite structure and stirring; supporting an alkaline earth metal alone or an alkaline earth metal and a group 8B metal on the hydrotalcite-like catalyst; and preparing the nickel-based catalyst represented by Chemical Formula 1 by sintering the catalyst on wherein the alkaline earth metal alone or the alkaline earth metal and the group 8B metal are supported under a nitrogen ($N_2$) or nitrogen monoxide (NO) atmosphere.

In another aspect, the present invention provides a method for preparing a synthesis gas having a $H_2$/CO monoxide molar ratio of 1-2.2, including performing steam carbon dioxide reforming of methane using steam and carbon dioxide in the presence of the catalyst according to any one of claims 1 to 4 under the condition of a reaction temperature of 600-1, 000° C., a reaction pressure of 1-35 bar, a space velocity of 1,000-100,000 $h^{-1}$ and a methane:steam:carbon dioxide molar ratio of 1:1-3:0.5-1.5.

In another aspect, the present invention provides a method for performing Fischer-Tropsch synthesis or methanol synthesis using a synthesis gas having a $H_2$/CO monoxide molar ratio of 1.8-2.2 prepared by the above-described method as a raw material.

Other features and aspects of the present invention will be apparent from the following detailed description, drawings and claims.

BRIEF DESCRIPTION OF THE DRAWINGS

The above and other objects, features and advantages of the present invention will now be described in detail with reference to certain exemplary embodiments thereof illustrated in the accompanying drawings which are given hereinbelow by way of illustration only, and thus are not limitative of the invention, and wherein.

Figure 1:
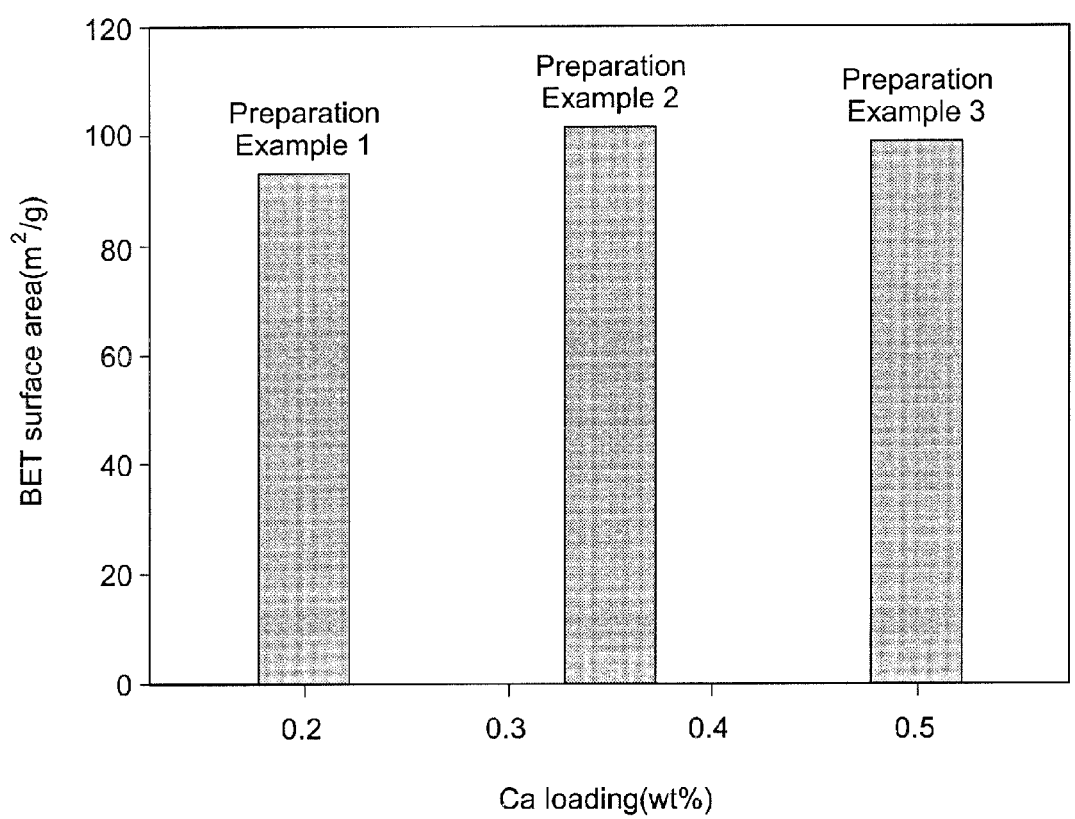
FIG. 1 shows the change in BET surface area of a Ni/MgAl catalyst depending on the content of co-precipitated Ca.

It should be understood that the appended drawings are not necessarily to scale, presenting a somewhat simplified representation of various preferred features illustrative of the basic principles of the invention. The specific design features of the invention as disclosed herein, including, for example, specific dimensions, orientations, locations and shapes, will be determined in part by the particular intended application and use environment.

DETAILED DESCRIPTION

Hereinafter, reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention relates to a nickel-based catalyst represented by Chemical Formula 1 wherein an alkaline earth metal alone or an alkaline earth metal and a group 8B metal are supported on a hydrotalcite-like catalyst containing nickel, magnesium and aluminum.

The nickel-based catalyst of the present invention may be prepared as follows.

As a first step, a solution of a precursor with a hydrotalcite structure containing a magnesium precursor and an aluminum precursor is prepared. As a second step, a $Ni_x/Mg_yAl$ hydrotalcite-like catalyst wherein nickel partially replaces magnesium is prepared by adding a nickel precursor to the solution of the precursor with a hydrotalcite structure and stirring. As a third step, an alkaline earth metal alone or an alkaline earth metal and a group 8B metal are supported on the $Ni_x/Mg_yAl$ catalyst. As a fourth step, the nickel-based catalyst represented by Chemical Formula 1 is prepared by sintering the catalyst on wherein the alkaline earth metal alone or the alkaline earth metal and the group 8B metal are supported under a nitrogen ($N_2$) or nitrogen monoxide (NO) atmosphere.

Precursors of magnesium, aluminum, nickel, the alkaline earth metal and the group 8B metal used to prepare the nickel-based catalyst according to the present invention may be the compounds commonly used in the art to prepare catalysts and are not specially limited. For example, the precursor may be one or more compound selected from an alkoxide compound, a nitrate compound, an acetate compound, a sulfate compound and a halide compound.

The $Ni_x/Mg_yAl$ catalyst prepared through the first and second steps of the method for preparing a nickel-based catalyst according to the present invention has a hydrotalcite-like structure wherein the nickel (Ni)/aluminum (Al) molar ratio is 0.25-1, the magnesium (Mg)/Al molar ratio is 0.6-5.5 and the Ni/Mg molar ratio is 0.15-0.45.

In the third step of the method for preparing the nickel-based catalyst according to the present invention, an alkaline earth metal alone or an alkaline earth metal and a group 8B metal are supported on the Ni/MgAl catalyst. In the present invention, the alkaline earth metal and the group 8B metal may be supported by different methods. That is to say, the alkaline earth metal may be supported through co-precipitation by solid phase crystallization (SPC) and the group 8B metal may be supported by impregnation.

To describe the solid phase crystallization method for supporting the alkaline earth metal in detail, a $B_b$-Ni/MgAl catalyst is prepared by precipitating an aqueous solution of the alkaline earth metal in an aqueous solution of Ni/MgAl by slowly dropping and then stirring for 3 hours. The supporting amount of the co-precipitated alkaline earth metal may be 0.1-10 wt %, specifically 0.1-5 wt %, more specifically 0.3-0.4 wt %, based on the Ni/MgAl catalyst. The alkaline earth metal replaces nickel which has the same valence. When the supporting amount of the alkaline earth metal is less than that described above, oxidation of the main active metal nickel under high pressure and harsh reaction conditions cannot be prevented and the effect of preventing carbon deposition may be insignificant. On the other, when the supporting amount of the alkaline earth metal exceeds 10 wt %, a better effect is not achieved and catalytic activity may decrease since the alkaline earth metal covers nickel particles.

The group 8B metal may be supported by an impregnation method commonly used for a $B_b$-Ni/MgAl catalyst. The supporting amount of the group 8B metal impregnated into the $B_b$-Ni/MgAl catalyst may be 0-10 wt %, specifically 0.01-3 wt %. It is possible to achieve the desired catalytic activity even when the group 8B metal is supported on the nickel-based catalyst of the present invention. However, when the group 8B metal is further supported, since oxidation-reduction reaction occurs quickly, catalytic activity may be improved due to inhibited oxidation of nickel and resistance of the catalyst to carbon deposition occurring during reforming may also be improved.

The sintering in the fourth step of the method for preparing the nickel-based catalyst according to the present invention is of great importance. Whereas the catalyst is sintered under an air atmosphere, sintering is performed under a nitrogen ($N_2$) or nitrogen monoxide (NO) atmosphere in the present invention. Since the size of catalyst particles is controlled and the structure of the Ni/MgAl hydrotalcite catalyst is stabilized through the sintering, the catalyst can be used for steam carbon dioxide reforming of methane at low temperature and high pressure with higher catalytic activity and resistance to carbon deposition.

In the nickel-based catalyst represented by Chemical Formula 1 prepared according to the method described above, the active metal nickel (Ni) is supported in an amount of 5-24 wt % based on the total weight of the catalyst. And, the catalyst has a specific surface area of 50-300 m$^2$/g, specifically 80-150 m$^2$/g.

The nickel-based catalyst of the present invention is useful as a catalyst for steam carbon dioxide reforming of natural gas. When steam carbon dioxide reforming is performed in the presence of the nickel-based catalyst of the present invention, a synthesis gas having a hydrogen/carbon monoxide molar ratio of 1-2.2 may be prepared. The steam carbon dioxide reforming for preparing the synthesis gas is performed under the condition of a reaction temperature 600-1,000° C., a reaction pressure of 1-35 bar, a space velocity of 1,000-100,000 h$^{-1}$ and a methane:steam:carbon dioxide molar ratio of 1:1-3:0.5-1.5. If the nickel-based catalyst of the present invention is used to prepare a synthesis gas, a synthesis gas having a hydrogen/carbon monoxide molar ratio of 1-2.2 can be prepared with the conversion rate of methane and carbon dioxide maintained high.

Since the synthesis gas obtained by steam carbon dioxide reforming has a H$_2$/CO molar ratio of 1-2.2, a synthesis gas having a H$_2$/CO molar ratio of 1.8-2.2 can be usefully used as a raw material for Fischer-Tropsch synthesis and methanol synthesis and a synthesis gas having a H$_2$/CO molar ratio of 1-1.2 for dimethyl ether synthesis.

EXAMPLES

The present invention will be described in more detail through examples. The following examples are for illustrative purposes only and it will be apparent to those skilled in the art not that the scope of this invention is not limited by the examples.

Preparation Examples

Preparation of Catalyst

Preparation Example 1

Preparation of Ca—Ni$_{0.99}$/Mg$_{2.25}$Al$_{1.0}$ (Ca 0.2 wt % Co-Precipitated, N$_2$ Sintering) Catalyst An aqueous solution of Na$_2$CO$_3$ was prepared by dissolving 1.409 g of Na$_2$CO$_3$ in 100 mL of distilled water. Aqueous solutions of metal precursors were prepared by dissolving 5 g of Al(NO$_3$)$_3$·9H$_2$O, 8.526 g of Mg(NO$_3$)$_2$·6H$_2$O and 1.764 g of Ni(NO$_3$)$_2$·6H$_2$O respectively in 50 mL of distilled water. The aqueous solutions of Al(NO$_3$)$_3$, Mg(NO$_3$)$_2$ and Ni(NO$_3$)$_2$ metal precursors were added to the aqueous solution of Na$_2$CO$_3$ prepared above and stirred. Pale green powder was formed immediately after the addition and a transparent solution was obtained after stirring for 3 hours.

0.025 g of Ca(NO$_3$)$_2$·4H$_2$O dissolved in 50 mL of distilled water was added to the transparent solution and stirred for 3 hours. An aqueous solution of NaOH (NaOH 3.5 g+H$_2$O 100 mL) was added dropwise until pH 10 to induce precipitation. Subsequently, after stirring vigorously for 30 minutes, the solution was left at 60° C. for 12 hours so that the precipitate has a hydrotalcite-like structure. The precipitate was then diluted with distilled water until pH 7 and dried at 60° C. for 12 hours to obtain a calcium co-precipitated nickel-based catalyst.

The prepared calcium co-precipitated nickel-based catalyst was heated at a rate of 5° C./min and sintered at 900° C. for 5 hours under a nitrogen atmosphere to obtain a nickel-based catalyst powder in which the active component nickel is dispersed uniformly not only on the surface of the support but also inside thereof. The prepared catalyst had a composition of Ca—Ni$_{0.99}$/Mg$_{2.25}$Al$_{1.0}$ wherein 0.2 wt % of calcium is co-precipitated and a specific surface area was 93.3 m$^2$/g.

Preparation Example 2

Preparation of Ca—Ni$_{0.99}$/Mg$_{2.25}$Al$_{1.0}$ (Ca 0.35 wt % Co-Precipitated, N$_2$ Sintering) Catalyst A catalyst was prepared in the same manner as in Preparation Example 1, except for using 0.044 g of Ca(NO$_3$)$_2$·4H$_2$O as a precursor of co-precipitated calcium. The prepared catalyst had a composition of Ca—Ni$_{0.99}$/Mg$_{2.25}$Al$_{1.0}$ wherein 0.35 wt % of calcium is co-precipitated and a specific surface area was 101.4 m$^2$/g.

Preparation Example 3

Preparation of Ca—Ni$_{0.99}$/Mg$_{2.25}$Al$_{1.0}$ (Ca 0.5 wt % Co-Precipitated, N$_2$ Sintering) Catalyst A catalyst was prepared in the same manner as in Preparation Example 1, except for using 0.064 of Ca(NO$_3$)$_2$·4H$_2$O as a precursor of co-precipitated calcium. The prepared catalyst had a composition of Ca—Ni$_{0.99}$/Mg$_{2.25}$Al$_{1.0}$ wherein 0.5 wt % of calcium is co-precipitated and a specific surface area was 95.6 m$^2$/g.

Preparation Example 4

Preparation of Rh—Ca—Ni$_{0.99}$/Mg$_{2.25}$Al$_{1.0}$ (Rh 0.35 wt % Impregnated, Ca 0.35 wt % Co-Precipitated, N$_2$ Sintering) Catalyst A calcium co-precipitated nickel-based catalyst was prepared in the same manner as in Preparation Example 2. Subsequently, an aqueous solution containing 0.015 g of RhCl$_3$ was impregnated into the prepared calcium co-precipitated nickel-based catalyst. After drying at 80° C. for 12 hours, a nickel-based catalyst modified with rhodium and calcium was obtained.

The nickel-based catalyst modified with rhodium and calcium prepared above was heated at a rate of 5° C./min and sintered at 900° C. for 5 hours under a nitrogen atmosphere to obtain a nickel-based catalyst powder in which the active component nickel is dispersed uniformly not only on the surface of the support but also inside thereof. The prepared catalyst had a composition of Rh—Ca—Ni$_{0.99}$/Mg$_{2.25}$Al$_{1.0}$ wherein 0.35 wt % of rhodium and 0.35 wt % of calcium are supported and a specific surface area was 81.1 m$^2$/g.

Preparation Example 5

Preparation of Ru—Ca—Ni$_{0.99}$/Mg$_{2.25}$Al$_{1.0}$ (Ru 0.35 wt % Impregnated, Ca 0.35 wt % Co-Precipitated, N$_2$ Sintering) Catalyst A catalyst was prepared in the same manner as in Preparation Example 4, except for using 0.015 g of RuCl$_3$ instead of RhCl$_3$. The prepared catalyst had a composition of Ru—Ca—Ni$_{0.99}$/Mg$_{2.25}$Al$_{1.0}$ wherein 0.35 wt % of ruthenium and 0.35 wt % of calcium are supported and a specific surface area was 92.5 m$^2$/g.

Comparative Preparation Example 1

Preparation of Ca—Ni$_{0.99}$/Mg$_{2.25}$Al$_{1.0}$ (Ca 0.35 wt % Impregnated, Air Sintering) Catalyst An aqueous solution of Na$_2$CO$_3$ was prepared by dissolving 1.409 g of Na$_2$CO$_3$ in 100 mL of distilled water. Aqueous solutions of metal precursors were prepared by dissolving 5 g of Al(NO$_3$)$_3$.9H$_2$O, 8.526 g of Mg(NO$_3$)$_2$.6H$_2$O and 1.764 g of Ni(NO$_3$)$_2$.6H$_2$O respectively in 50 mL of distilled water. The aqueous solutions of Al(NO$_3$)$_3$, Mg(NO$_3$)$_2$ and Ni(NO$_3$)$_2$ metal precursors were added to the aqueous solution of Na$_2$CO$_3$ prepared above and stirred. Pale green powder was formed immediately after the addition and a transparent solution was obtained after stirring for 3 hours.

An aqueous solution of NaOH (NaOH 3.5 g+H$_2$O 100 mL) was added dropwise until pH 10 to induce precipitation. Subsequently, after stirring vigorously for 30 minutes, the solution was left at 60° C. for 12 hours so that the precipitate has a hydrotalcite-like structure. The precipitate was then diluted with distilled water until pH 7 and dried at 60° C. for 12 hours to obtain a nickel-based catalyst.

The prepared nickel-based catalyst was heated at a rate of 5° C./min and sintered at 900° C. for 5 hours under an air atmosphere to obtain a nickel-based catalyst powder in which the active component nickel is dispersed uniformly not only on the surface of the support but also inside thereof.

Subsequently, an aqueous solution containing 0.044 g of Ca(NO$_3$)$_2$.4H$_2$O was impregnated into the prepared nickel-based catalyst powder. After drying at 80° C. for 12 hours and sintering at 900° C. for 5 hours under an air atmosphere, a calcium impregnated nickel-based catalyst was obtained. The prepared catalyst had a composition of Ca—Ni$_{0.99}$/Mg$_{2.25}$Al$_{1.0}$ wherein 0.35 wt % of calcium is impregnated and a specific surface area was 85.1 m$^2$/g.

Comparative Preparation Example 2

Preparation of Rh—Ni$_{0.99}$/Mg$_{2.25}$Al$_{1.0}$ (Rh 0.35 wt % Impregnated, Air Sintering) Catalyst A catalyst was prepared in the same manner as in Comparative Preparation Example 1, except for using 0.015 g of RhCl$_3$ instead of Ca(NO$_3$)$_2$.4H$_2$O. The prepared catalyst had a composition of Rh—Ni$_{0.99}$/Mg$_{2.25}$Al$_{1.0}$ wherein 0.34 wt % of rhodium is impregnated and a specific surface area was 60.5 m$^2$/g.

Comparative Preparation Example 3

Preparation of Ru—Ni$_{0.99}$/Mg$_{2.25}$Al$_{1.0}$ (Ru 0.35 wt % Impregnated, Air Sintering) Catalyst A catalyst was prepared in the same manner as in Comparative Preparation Example 1, except for using 0.015 g of RuCl$_3$ instead of Ca(NO$_3$)$_2$.4H$_2$O. The prepared catalyst had a composition of Ru—Ni$_{0.99}$/Mg$_{2.25}$Al$_{1.0}$ wherein 0.34 wt % of ruthenium is impregnated and a specific surface area was 89.2 m$^2$/g.

Comparative Preparation Example 4

Preparation of Ni/γ-Al$_2$O$_3$ Catalyst

For comparison of performance with the catalysts prepared according to the present invention, a Ni/γ-Al$_2$O$_3$ catalyst which is used the most frequently for steam reforming of natural gas was prepared by an impregnation method.

That is to say, a catalyst wherein 20 wt % nickel is supported on γ-Al$_2$O$_3$ was prepared and drying and sintering were carried out under the same condition. The prepared Ni/γ-Al$_2$O$_3$ catalyst had a surface area of 81.2 m$^2$/g.

Preparation conditions of Preparation Examples 1-5 and Comparative Preparation Examples 1-4 and characteristics of the prepared catalysts are summarized in Table 1.

TABLE 1

| | Catalyst composition | Sintering condition | Supporting method | Ca, Pt, Rh or Ru supporting amount (wt %)[a] | Ni supporting amount (wt %)[a] | BET surface area (m$^2$/g)[b] |
|---|---|---|---|---|---|---|
| Prep. Ex. 1 | Ca—Ni/MgAl | N$_2$ | Co-precipitation | 0.2 | 20.2 | 93.3 |
| Prep. Ex. 2 | Ca—Ni/MgAl | N$_2$ | Co-precipitation | 0.35 | 20.0 | 101.4 |
| Prep. Ex. 3 | Ca—Ni/MgAl | N$_2$ | Co-precipitation | 0.5 | 20.1 | 98.8 |
| Prep. Ex. 4 | Rh—Ca—Ni/MgAl | N$_2$ | Co-precipitation, impregnation | 0.35 | 20.2 | 81.1 |
| Prep. Ex. 5 | Ru—Ca—Ni/MgAl | N$_2$ | Co-precipitation, impregnation | 0.35 | 20.1 | 92.5 |
| Comp. Prep. Ex. 1 | Ca—Ni/MgAl | Air | Impregnation | 0.35 | 20.0 | 85.1 |
| Comp. Prep. Ex. 2 | Rh—Ni/MgAl | Air | Impregnation | 0.34 | 20.1 | 60.5 |
| Comp. Prep. Ex. 3 | Ru—Ni/MgAl | Air | Impregnation | 0.34 | 20.1 | 89.2 |
| Comp. Prep. Ex. 4 | Ni/γ-Al$_2$O$_3$ | Air | Impregnation | 0 | 20.0 | 81.2 |

[a]Active metal supporting amount, was analyzed by ICP/MS
[b]BET surface area was analyzed by Autosorb-1 (Quantachrome).

As seen from Table 1, the hydrotalcite catalysts prepared by co-precipitation exhibited higher specific surface area than the catalysts prepared by impregnation.

FIG. 1 shows the change in catalytic activity when the content of calcium co-precipitated in the Ni/MgAl catalyst was varied from 0.2 to 0.5 wt %. As seen from FIG. 1, the highest BET surface area was achieved when the Ca content was 0.35 wt %.

Examples

Steam Carbon Dioxide Reforming of Methane Under High-Pressure Condition

Example 1

In order to measure catalytic activity under a high-pressure condition, steam carbon dioxide reforming of methane was performed using a laboratory-made fixed-bed catalytic reactor.

Specifically, the catalyst prepared in Preparation Example 1 was passed through a sieve of 80-100 mesh and 2.0 g of the catalyst with a particle size of 150-250 μm was packed in the reactor and reduced at 700° C. for 3 hours with 5% hydrogen/nitrogen before beginning the reaction. The optimum reaction condition was computed using the simulation software Gibbs Reactor (PRO-II) and the experiment was performed at 21 bar and 900° C., with a $CH_4:H_2O:CO_2$ molar ratio of 1.0:1.63:0.6 and a reactant space velocity of 3,000 $h^{-1}$. Among the reactants, gas was injected into the reactor using a mass flow controller and water was supplied into the reactor after injecting into a vaporizer using an HPLC pump and vaporizing into steam. Steam carbon dioxide reforming of methane was performed under a high-temperature, high-pressure condition of 900° C. and 21 bar for 24 hours and long-term stability resistance to carbon deposition of the catalyst was evaluated. Gas composition before and after the reaction was analyzed on-line by gas chromatography directly coupled with the reactor. A Carbosphere column was used for separation of gas. The result of performing steam carbon dioxide reforming of methane in the presence of the catalyst is summarized in Table 2.

Examples 2-5

Steam carbon dioxide reforming of methane was performed in the same manner as in Example 1, except for using the catalysts prepared in Preparation Examples 2-5 instead of the catalyst prepared in Preparation Example 1. The result is also summarized in Table 2.

Comparative Example 1-4

Steam carbon dioxide reforming of methane was performed in the same manner as in Example 1, except for using the catalysts prepared in Comparative Preparation Examples 1-4 instead of the catalyst prepared in Preparation Example 1. The result is also summarized in Table 2.

TABLE 2

| | Conversion rate (%) | | Product composition (mol %) | | | | $H_2/CO$ molar ratio | Carbon deposition |
|---|---|---|---|---|---|---|---|---|
| | $CH_4$ | $CO_2$ | $H_2$ | CO | $CO_2$ | $CH_4$ | | |
| Ex. 1 | 81.20 | 60.10 | 61.20 | 30.27 | 4.52 | 5.20 | 1.98 | Not observed |
| Ex. 2 | 83.24 | 60.16 | 62.02 | 31.32 | 2.74 | 3.92 | 1.98 | Not observed |
| Ex. 3 | 81.80 | 60.05 | 61.56 | 31.16 | 3.15 | 4.13 | 1.98 | Not observed |
| Ex. 4 | 80.31 | 59.60 | 60.56 | 30.10 | 4.91 | 4.43 | 2.01 | Not observed |
| Ex. 5 | 80.52 | 59.33 | 60.14 | 30.25 | 4.88 | 4.73 | 1.99 | Not observed |
| Comp. Ex. 1 | 79.28 | 58.56 | 60.87 | 28.51 | 4.63 | 5.99 | 2.14 | Observed |
| Comp. Ex. 2 | 78.24 | 58.10 | 59.32 | 29.22 | 5.95 | 5.51 | 2.03 | Observed |
| Comp. Ex. 3 | 80.04 | 59.41 | 59.54 | 29.45 | 5.91 | 5.10 | 2.02 | Observed |
| Comp. Ex. 4 | 75.63 | 60.21 | 60.73 | 27.82 | 5.79 | 5.66 | 2.18 | Observed |

As seen from Table 2, the nickel-based catalysts according to the present invention (Examples 1-5) showed high conversion rate of methane and carbon dioxide. The $H_2/CO$ molar ratio of the prepared synthesis gas was maintained at about 2±0.02 and no increase in pressure inside the reactor or carbon deposition was observed during the steam carbon dioxide reforming. Also, carbon deposition was hardly observed in the recovered catalyst.

When steam carbon dioxide reforming was performed in the presence of the catalysts of Comparative Examples 1-4, conversion rate of methane and carbon dioxide was high, but the sign of carbon deposition was observed during the steam carbon dioxide reforming because of increase in pressure inside the reactor. Also, carbon deposition was observed in the recovered catalyst.

Considering that carbon deposition not only deactivates the catalyst but also causes increase in pressure inside the reactor by blocking it, the nickel-based catalysts according to the present invention (Examples 1-5) are superior catalysts.

Figure 2:
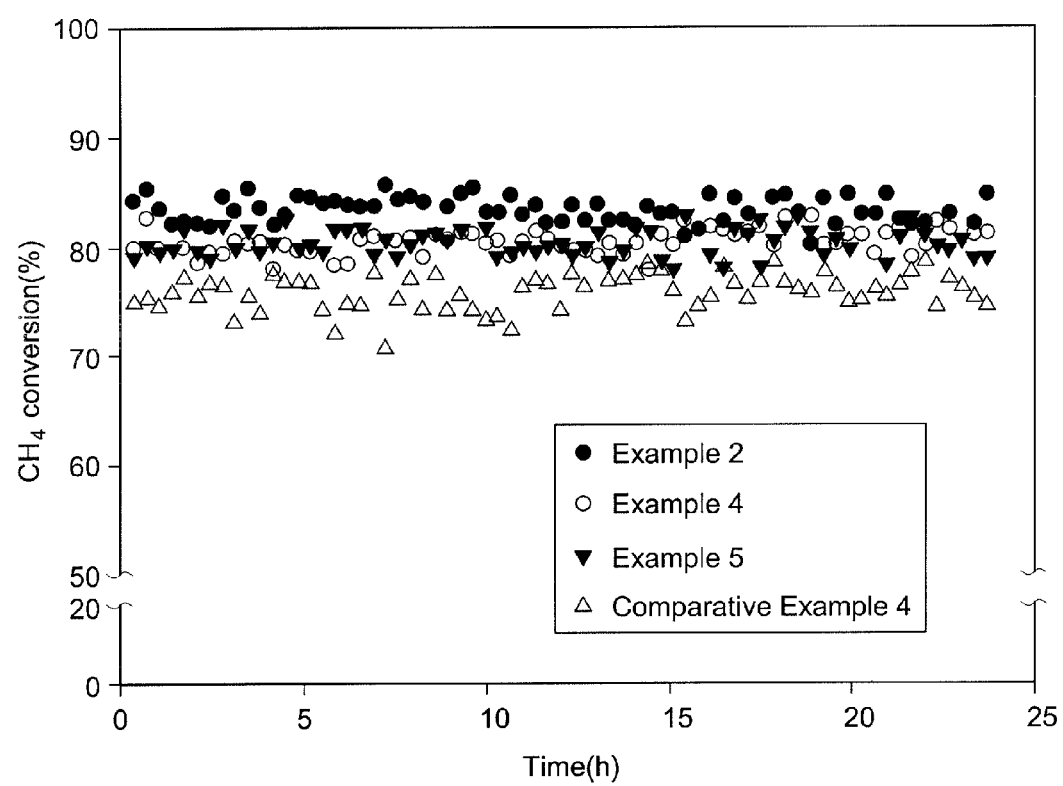
FIG. 2 compares methane conversion rate for the catalysts prepared in Examples 2, 4 and 5 and Comparative Example 4 depending on reaction time.

FIG. 2 compares methane conversion rate for the catalysts prepared in Examples 2, 4 and 5 and Comparative Example 4 depending on reaction time. The catalyst prepared in Example 2 showed the highest methane conversion rate. This catalyst exhibits the best performance in steam carbon dioxide reforming of methane at high pressure with little carbon deposition.

Since the synthesis gas prepared by steam carbon dioxide reforming according to the present invention has a hydrogen/carbon monoxide molar ratio maintained at 1-2.2, a synthesis gas having a $H_2$/CO molar ratio of 1.8-2.2 may be used as a raw material for Fischer-Tropsch synthesis or methanol synthesis and a synthesis gas having a $H_2$/CO molar ratio of may be used as a raw material for dimethyl ether synthesis.

The nickel-based catalyst for steam carbon dioxide reforming according to the present invention can greatly contribute to a compact reforming process for preparation of clean fuel and a simplified GTL process since it exhibits superior activity and long-term durability by inhibiting deactivation of the catalyst due to coke generation.

In particular, the nickel-based catalyst for steam carbon dioxide reforming according to the present invention is useful as a catalyst for reforming of a synthesis gas for economically utilizing carbon dioxide-rich natural gas from stranded gas fields or associated gas from oil fields.

The present invention has been described in detail with reference to specific embodiments thereof. However, it will be appreciated by those skilled in the art that various changes and modifications may be made in these embodiments without departing from the principles and spirit of the invention, the scope of which is defined in the appended claims and their equivalents.

What is claimed is:

1. A hydrotalcite-like catalyst represented by Chemical Formula 1, which is used for steam carbon dioxide reforming of natural gas using steam and carbon dioxide:

$$A_a\text{-}B_b\text{-}Ni_x/Mg_yAl \quad \text{[Chemical Formula 1]}$$

wherein A is one or more group 8B metal atoms, B is one or more alkaline earth metal atoms, a and b are supporting amounts of the group 8B metal atoms and the alkaline earth metal atoms based on $Ni_x/Mg_yAl$, with a being 0-10 wt % and b being 0.1-10 wt %, x is a Ni/Al molar ratio and is 0.25-1, y is a Mg/Al molar ratio and is 0.6-5.5, and x/y is 0.15-0.45.

2. The hydrotalcite-like catalyst according to claim 1, wherein the nickel (Ni) is supported in an amount of 5-24 wt % based on the total weight of the catalyst.

3. The hydrotalcite-like catalyst according to claim 1, wherein the catalyst has a specific surface area of 50-300 $m^2$/g.

4. The hydrotalcite-like catalyst according to claim 1, wherein the catalyst is sintered under a nitrogen ($N_2$) or nitrogen monoxide (NO) atmosphere.

5. A method for preparing a nickel-based catalyst, comprising:
   preparing a solution of a precursor with a hydrotalcite structure comprising a magnesium precursor and an aluminum precursor;
   preparing a $Ni_x/Mg_yAl$ hydrotalcite-like catalyst wherein nickel partially replaces magnesium by adding a nickel precursor to the solution of the precursor with a hydrotalcite structure and stirring;
   supporting an alkaline earth metal alone or an alkaline earth metal and a group 8B metal on the hydrotalcite-like catalyst; and
   preparing a nickel-based catalyst represented by Chemical Formula 1 by sintering said supported catalyst under a nitrogen ($N_2$) or nitrogen monoxide (NO) atmosphere:

$$A_a\text{-}B_b\text{-}Ni_x/Mg_yAl \quad \text{[Chemical Formula 1]}$$

wherein A is one or more group 8B metal atoms, B is one or more alkaline earth metal atoms, a and b are supporting amounts of the group 8B metal atoms and the alkaline earth metal atoms based on $Ni_x/Mg_yAl$, with a being 0-10 wt % and b being 0.1-10 wt %, x is a Ni/Al molar ratio and is 0.25-1, y is a Mg/Al molar ratio and is 0.6-5.5, and x/y is 0.15-0.45.

6. The method for preparing a nickel-based catalyst according to claim 5, wherein the alkaline earth metal supported on the hydrotalcite-like catalyst is supported through co-precipitation by solid phase crystallization (SPC).

7. The method for preparing a nickel-based catalyst according to claim 5, wherein the group 8B metal supported on a hydrotalcite-like catalyst is supported by impregnation.

8. A method for preparing a synthesis gas having a hydrogen/carbon monoxide molar ratio of 1-2.2, comprising performing steam carbon dioxide reforming of methane using steam and carbon dioxide in the presence of a hydrotalcite-like catalyst represented by Chemical Formula 1 under the condition of a reaction temperature of 600-1,000° C., a reaction pressure of 1-35 bar, a space velocity of 1,000-100,000 $h^{-1}$ and a methane:steam:carbon dioxide molar ratio of 1:1-3:0.5-1.5:

$$A_a\text{-}B_b\text{-}Ni_x/Mg_yAl \quad \text{[Chemical Formula 1]}$$

wherein A is one or more group 8B metal atoms, B is one or more alkaline earth metal atoms, a and b are supporting amounts of the group 8B metal atoms and the alkaline earth metal atoms based on $Ni_x/Mg_yAl$, with a being 0-10 wt % and b being 0.1-10 wt %, x is a Ni/Al molar ratio and is 0.25-1, y is a Mg/Al molar ratio and is 0.6-5.5, and x/y is 0.15-0.45.

9. The method for preparing a synthesis gas according to claim 8, wherein the nickel (Ni) of the hydrotalcite-like catalyst is supported in an amount of 5-24 wt % based on the total weight of the catalyst.

10. The method for preparing a synthesis gas according to claim 8, wherein the hydrotalcite-like catalyst has a specific surface area of 50-300 $m^2$/g.

11. The method for preparing a synthesis gas according to claim 8, wherein the hydrotalcite-like catalyst is sintered under a nitrogen ($N_2$) or nitrogen monoxide (NO) atmosphere.

12. The method for preparing a synthesis gas according to claim 8, wherein the $H_2$/CO molar ratio of the prepared synthesis gas is controllable with the molar ratio of the reactants and the synthesis gas is used as a raw material for Fischer-Tropsch synthesis, methanol synthesis or dimethyl ether synthesis.

* * * * *